March 6, 1951

RENÉ LUCIEN LEVY,
ALSO KNOWN AS RENE LUCIEN
PACKING DEVICE FOR HYDRAULIC
FLUID-TIGHT SLIDING JOINTS 2,544,537

Filed Feb. 20, 1948

Inventor
Rene Lucien Levy
also known as
Rene Lucien
By Glascock Downing Seebly
Attys.

March 6, 1951

RENÉ LUCIEN LEVY,
ALSO KNOWN AS RENE LUCIEN
PACKING DEVICE FOR HYDRAULIC
FLUID-TIGHT SLIDING JOINTS 2,544,537

Filed Feb. 20, 1948

Inventor
Rene Lucien Levy
Also known as
Rene Lucien
By Glascock Downing Reed
Attys.

March 6, 1951 — RENÈ LUCIEN LEVY, ALSO KNOWN AS RENE LUCIEN — 2,544,537
PACKING DEVICE FOR HYDRAULIC FLUID-TIGHT SLIDING JOINTS
Filed Feb. 20, 1948 — 3 Sheets-Sheet 3

Patented Mar. 6, 1951

2,544,537

UNITED STATES PATENT OFFICE 2,544,537

PACKING DEVICE FOR HYDRAULIC FLUID-TIGHT SLIDING JOINTS

René Lucien Levy, also known as René Lucien, Paris, France, assignor to Societe d'Inventions Aeronautiques et Mecaniques S. I. A. M., Geneva, Switzerland, a corporation of Switzerland Application February 20, 1948, Serial No. 9,867
In France February 24, 1947

1 Claim. (Cl. 286—27)

The present invention refers to hydraulic fluid-tight sliding joints, and more particularly to oleo-pneumatic sliding joints between a cylinder and a piston, a stuffing-box and a piston-rod, etc., of the type in which a liquid under pressure acts as a lubricant on one side only of the joint, the other side remaining dry by being either open to the atmosphere or in contact with a gas or air under pressure.

The packing rings—usually of the elastic type—utilized to realize the fluid-tightness of such sliding joints are liable to a peculiar cause of wear and deterioration, due to the fact that their opposite active edges work under quite different conditions: one being constantly wetted and lubricated by the operating oil under pressure and the other working in a dry condition.

When applied to hydraulic machinery elements, in which the sliding member of the joint, or part thereof, extends outside of the fixed tubular member of the joint and slides alternatively in the open air and in the fluid-tight closed operating space of the element—as in the case, for instance, of a stuffing-box, through which works a piston-rod, which is bound to project outside of the operating cylinder—this sliding part, being exposed to vitiated air, receives and carries along particles of dust and minute foreign abrasive bodies, which penetrate into said closed operating space and, in the long run and progressively, deteriorate the packing rings of the sliding joint, or—in the case of a stuffing-box—of both the sliding joint between the cylinder-end and the piston-rod and the sliding joint between the cylinder-wall and the piston working therein.

The object of the invention is to protect the packing rings of hydraulic sliding joints against these two causes of deterioration and thereby to prolong their useful life and to improve their efficiency.

This object is attained by providing an annular chamber for an auxiliary liquid lubricant in the part of the joint carrying the packing ring or rings and means for establishing a permanent communication between said chamber and the active edge of said ring or rings which would otherwise work in a dry condition, so as to keep said edge constantly lubricated.

A feature of the invention is to provide an auxiliary packing ring, on the side of said annular chamber opposed to the main packing ring to be protected, to retain said auxiliary lubricant within said chamber.

Another feature consists in the fact that this annular chamber—besides insuring a permanent lubrication of the side of the main packing ring not in contact with the operating liquid under pressure—acts as a collector of the foreign bodies or particles brought from the exterior by the sliding member of the joint; or—in the case of the use of the above-mentioned auxiliary packing ring—in the fact that this latter prevents said foreign bodies or particles from reaching the main packing ring or rings to be protected.

A further feature of the invention is to provide an auxiliary reservoir and a permanent communication between said reservoir and the annular chamber for replenishing this latter with auxiliary liquid lubricant under either no pressure or a very low pressure in order that the auxiliary packing ring will not suffer from being lubricated on one side only.

Other objects, features and advantages of the present invention will become apparent from the reading of the following description, in which several embodiments of the invention will now be described as examples, in reference to the accompanying drawings, in which.

Figure 1:
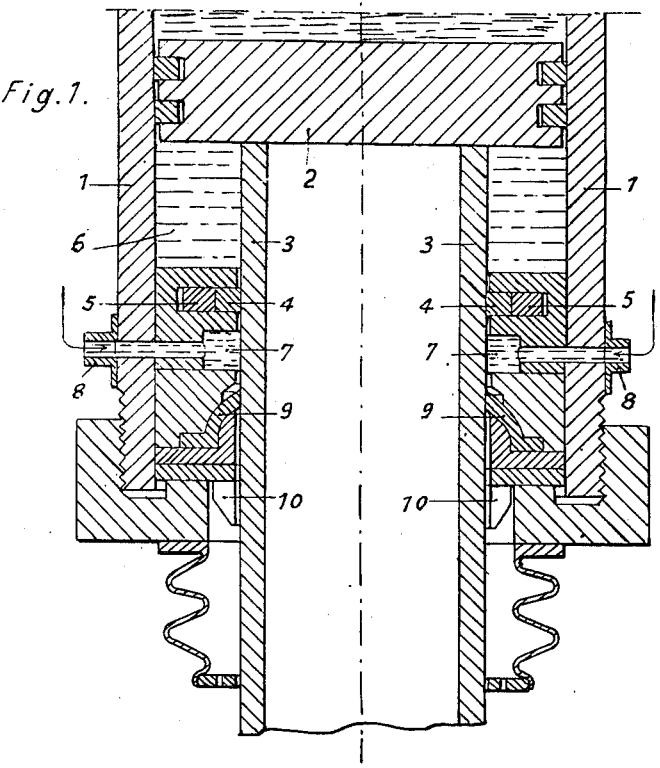
Fig. 1 is a partial axial section of an hydraulic cylinder having the packing ring of its stuffing-box protected according to the invention.
Figure 2:
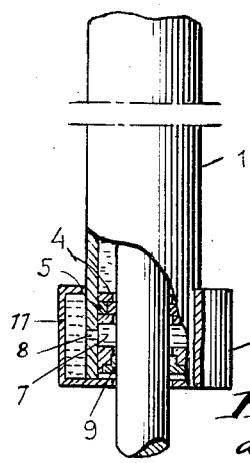
Fig. 2 is an elevation with part in axial section of a similar hydraulic cylinder to the stuffing-box of which is adapted another embodiment of the invention.

In the first embodiment (Fig. 1), 1 indicates an hydraulic cylinder in which works a piston 2 having a piston-rod 3.

This piston-rod slides in a stuffing-box, the tightness of which is insured by a main packing ring of any suitable type. In this example, this packing ring is of the type comprising two concentric rings 4, 5, made of rubber of different resiliency. This dual or composite packing ring, so-called "high-pressure" ring, in known types of high-pressure hydraulic cylinders, is usually lubricated but on its upper edge, facing the high-pressure liquid 6, by contact with said liquid. Contradistinctly, according to the present invention, an annular chamber 7 for an auxiliary liquid lubricant is provided on the opposite side of the rings 4, 5 with respect to the liquid 6. This chamber is kept constantly filled with lubricating liquid by two diametrically opposed feeding conduits 8 communicating with any outer source of lubricant (not shown).

Due to the fact that there exists only a sliding fit between the inner periphery of the fixed body of the stuffing-box and the outer periphery of the piston-rod 3, the high-pressure operating liquid 6 infiltrates therebetween to lubricate the upper active edge of the inner ring 4, while the auxiliary liquid filling the annular chamber 7 infiltrates therebetween to lubricate the lower edge of said inner ring 4.

On the opposite side of the main packing rings 4, 5, with respect to said annular chamber 7, the fixed body of the stuffing-box is provided with an auxiliary packing ring 9, so-called "low pressure ring," which may be of any suitable type, but has preferably the inverted cup shape shown on the drawings, as this shape is particularly well adapted for retaining effectively the auxiliary lubricant under no pressure at all or under a very low pressure—in the annular chamber 7, without creating a substantial friction on the piston-rod 3.

The way both the main rings 4, 5 and the auxiliary ring 9 are mounted in their respective annular grooves and the parts used for realizing this mounting do not belong to the invention and are not described or shown in further detail.

A cleaning scraper 10 is mounted at the bottom of the stuffing-box around the piston-rod 3 so as to scrape the periphery of this latter and thereby insure a preliminary elimination of the foreign bodies or particles tending to penetrate into the stuffing-box with the piston-rod 3.

The auxiliary reservoir—preferably under load or low pressure in order to maintain the annular chamber 7 constantly filled with lubricant—is constituted, in the embodiment shown in Figs. 2 to 5, by an annular cylindrical container 11 surrounding the hydraulic cylinder 1 opposite the stuffing-box thereof and forming thus an appendage of said cylinder 1.

Figure 3:
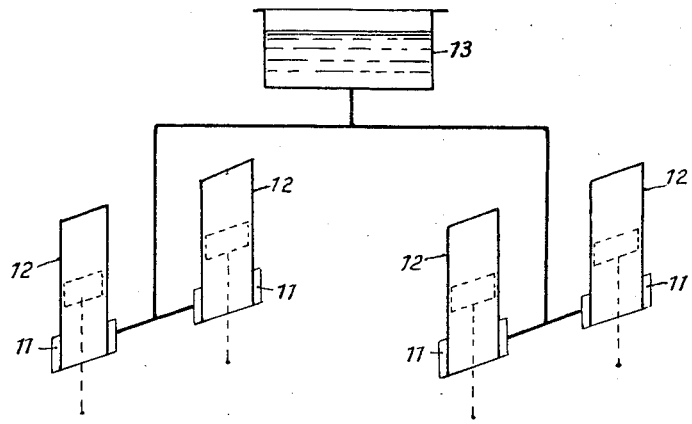
Fig. 3 is a diagram showing schematically the application of the embodiment of Fig. 2 to the hydraulic shock-absorbing system of a vehicle such as an automobile.

The putting under load of this auxiliary reservoir is effected, in the example of Fig. 3—which shows this embodiment applied to the four-hydraulic shock-absorbers 12 of a vehicle suspension system—by interconnecting each of the four appendages 11 with a common source 13 of liquid lubricant located substantially above the level of the four corresponding annular chambers (not shown).

Figure 4:
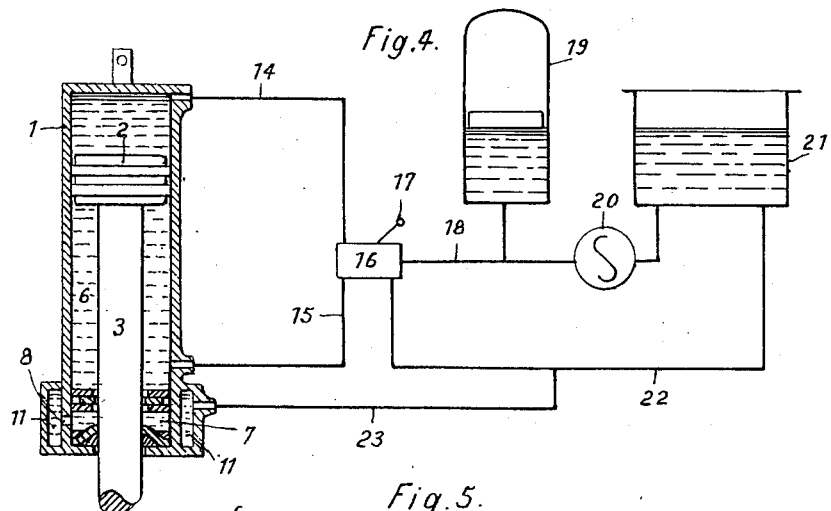
Fig. 4 is another diagram showing, part in axial section and part schematically, the application of the embodiment of Fig. 2 to the stuffing-box of a double-acting servo-motor belonging to an hydraulic system of transmission of energy and used, for instance, to control the operation of the retractable landing gear of an aircraft.

In the application of this embodiment of the invention to a double-acting servo-motor shown in Fig. 4, this servo-motor or jack is fed by either of two pressure lines 14, 15 according to the position of the control lever 17 of a four-way valve 16. This latter is connected by a pressure line 18 to an oleo-pneumatic accumulator 19 and to a pump 20, fed from a reservoir 21; and, respectively, by a return line 22 directly to said reservoir 21.

In this case, the putting under load or low pressure of the auxiliary reservoir 11 is effected by means of a conduit 23 interconnecting said reservoir and the return line 22.

Figure 5:
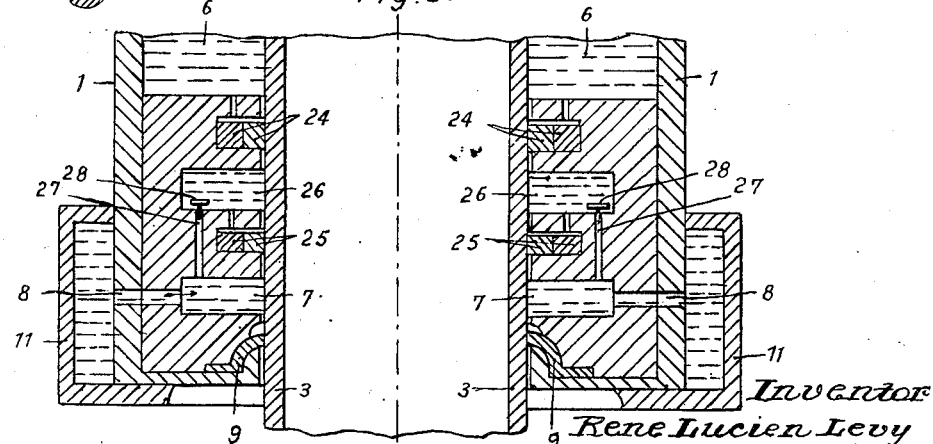
Fig. 5 is a partial axial section showing another embodiment of the invention adapted to protect the two packing-rings of the stuffing-box of an hydraulic cylinder; and, Fig. 6 is an axial section of a piston having its packing ring protected according to the invention.

In Fig. 5 the improvement of the invention is shown applied in the case—frequent in the manufacture of aircrafts or automobiles—where it is desired to increase the tightness of a sliding joint by using two main packing rings 24, 25, arranged in series on the periphery of a piston-rod 3.

In such a case, the provision of a single lubricating chamber 7 under the lower ring 25 would merely protect the lower edge of this latter and would leave unprotected, that is in a dry condition, both the upper edge of said ring 25 and the lower edge of the upper ring 24. To avoid this and protect equally both packing rings 24 and 25, one provides in this case between the rings 24, 25 in the fixed body of the stuffing-box a second annular chamber 26 and longitudinal passages 27 establishing a communication between the chamber 7 and said chamber 26.

A valve 28 is provided at the upper end of each passage 27 so as to close automatically this passage, when a leak occurs in the upper ring 24, under the action of the high pressure then built up by the leaking liquid in the annular chamber 26. From then on, the second packing ring 25 enters effectively into action to act as main packing ring.

Figure 6:
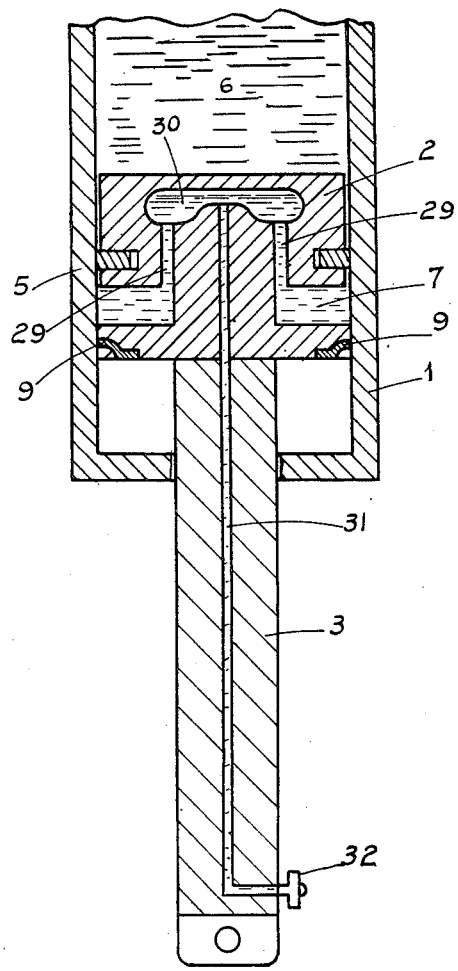

Fig. 6 shows the application of a packing ring protected according to the invention to the piston of a single-acting hydraulic cylinder.

In this example, the lubricating chamber 7 is provided in the periphery of the piston 2 between the "high pressure" packing ring 5 and the auxiliary "low pressure" packing ring 9. The feeding of said chamber 7 is realized by the intermediary of longitudinal channels 29 establishing a permanent communication between said chamber 7 and an auxiliary storage chamber 30 provided in the head of the piston 2 itself, above the packing ring 5. This storage chamber 30, in turn, is fed with liquid lubricant from an exterior reservoir (not shown) through an axial passage 31, a pipe-coupling 32 and a flexible tube (not shown).

I claim:

In a fluid-tight sliding joint for hydraulic cylinders of the type comprising two main inner high pressure packing rings, one side only of one of which being lubricated by the liquid under high pressure operating in said cylinder, an auxiliary low-pressure packing ring; a first lubricating chamber formed between said two main packing rings to lubricate the sides of said rings adjacent thereto; a second lubricating chamber formed between said auxiliary ring and one of said main rings to lubricate the opposite side of this latter; longitudinal passages between the two chambers; valves to close automatically said passages when the liquid under high-pressure penetrates into the first chamber due to a leak of one of said main rings, and means adapted to maintain said second chamber constantly filled with an auxiliary lubricant under low-pressure.

RENÉ LUCIEN LEVY,
*Also known as René Lucien.*

REFERENCES CITED

The following references are of record in the file of this patent:

UNITED STATES PATENTS

| Number | Name | Date |
| --- | --- | --- |
| 337,874 | Schuhle | Mar. 16, 1886 |
| 363,456 | Ford | May 24, 1887 |
| 1,971,542 | Taylor | Aug. 28, 1934 |
| 2,204,310 | Holmquist | June 11, 1940 |